United States Patent [19]
Dearnaley et al.

[11] Patent Number: 5,922,415
[45] Date of Patent: Jul. 13, 1999

[54] LUBRICATION OF MAGNETIC DISK STORAGE MEDIA

[75] Inventors: Geoffrey Dearnaley; James Arps, both of San Antonio, Tex.

[73] Assignee: Southwest Research Institute, San Antonio, Tex.

[21] Appl. No.: 08/878,056

[22] Filed: Jun. 18, 1997

Related U.S. Application Data

[60] Provisional application No. 60/020,133, Jun. 20, 1996.
[51] Int. Cl.⁶ ........................................................ G11B 5/84
[52] U.S. Cl. ...................... 427/490; 427/255.6; 427/523; 427/525; 427/533
[58] Field of Search ................................ 427/255.6, 523, 427/525, 533, 490

[56] References Cited

U.S. PATENT DOCUMENTS

| | | | |
|---|---|---|---|
| 4,264,642 | 4/1981 | Ferralli | 427/38 |
| 4,647,494 | 3/1987 | Meyerson et al. | 428/216 |
| 4,816,334 | 3/1989 | Yokoyama et al. | 427/40 |
| 4,960,609 | 10/1990 | Homola et al. | 427/38 |
| 5,009,923 | 4/1991 | Ogata et al. | 427/38 |
| 5,192,523 | 3/1993 | Wu et al. | 427/523 |
| 5,266,409 | 11/1993 | Schmidt | 428/446 |
| 5,525,392 | 6/1996 | Baum et al. | 427/551 |
| 5,591,481 | 1/1997 | Takahashi et al. | 427/131 |

*Primary Examiner*—Stevan A. Resan
*Attorney, Agent, or Firm*—Madan & Morris, PC

[57] ABSTRACT

The present invention provides a diamond like carbon coating comprising a surface comprising an interface and a lubricant film, said interface comprising atomic bonds between atoms in said diamond-like carbon coating and atoms in said lubricant precursor film. The invention also provides a method for producing said coating, interface, and film.

26 Claims, No Drawings

LUBRICATION OF MAGNETIC DISK STORAGE MEDIA

This application claims the benefit of Ser. No. 60/020,133, filed on Jun. 20, 1996.

FIELD OF THE INVENTION

The present invention relates to methods for forming an interface between an amorphous carbon coating and a lubricant film, said interface comprising atomic bonds between atoms in the amorphous carbon coating and atoms in the lubricant film, whereby the lubricant film strongly adheres to the amorphous carbon coating.

BACKGROUND OF THE INVENTION

Amorphous carbon or diamond-like carbon ("DLC") coatings have been used to coat a number of different surfaces that encounter frictional contact and wear during use. DLC is chemically inert and is known to have a low coefficient of friction. DLC coatings also have been shown to be extremely smooth, unlike polycrystalline diamond deposits.

In some applications, it is desirable to coat the DLC with a lubricant film, typically a perfluorinated lubricant film, to further decrease friction and wear. For example, lubricant films are desirable for magnetic recording media.

Magnetic recording media generally are comprised of a magnetic coating material deposited on a permanent substrate. The magnetic coating material usually consists of a binder having ferromagnetic materials therein, or a metallic layer comprising a magnetic material. An example of a magnetic recording media is a hard disk having a substrate of aluminum or silicon and a magnetic metallic coating thereon, which can be an alloy such as GdCo, CoPtCr, CrV—CoPtCr, etc.

Magnetic recording media are used in combination with magnetic recording heads or transducers to produce read, write, and erase functions. As the technology has developed, the thickness of the magnetic metallic layer has decreased and the "density," or the total number of bits that can be stored on the magnetic recording medium, has increased.

Higher density recording has required that the recording heads be brought into closer and closer physical contact with the metallic magnetic recording layer. Very often, this results in "crashing" of the recording head into the magnetic recording medium. "Crashing" results in wear on the magnetic metallic layer and on the surface of the magnetic recording head. Crashing also may destroy data that is stored on the metallic magnetic recording layer.

In order to prevent crashing, an ultra-thin (less than 200 Å, or less than 20 nm) protective layer of DLC has been provided to make the magnetic recording layer abrasion-resistant. In order to even further decrease friction and wear, the DLC has been coated with an even thinner film of lubricant, typically a perfluorinated lubricant.

The bond between the storage medium and the DLC coatings generally has been strong; however, the bond between the DLC coatings and the lubricant films has been weak. Research has shown that perfluorinated lubricants do not chemically bond to DLC, but are bound to DLC coatings by mere van der Waals forces. As a result of the weak attraction between the DLC and the lubricant, it is possible for a lubricant film to fail upon high-velocity impact with a slider head.

A means is needed to provide stronger bonding between DLC and a lubricant coating.

SUMMARY OF THE INVENTION

The present invention provides a method for adhering a lubricant coating to a diamond-like carbon coating comprising directing a vaporized stream of a perfluorinated lubricant onto said diamond-like carbon coating in a vacuum, at a temperature, and under conditions effective to condense said perfluorinated lubricant onto said diamond-like carbon coating in an amount sufficient to form a lubricant precursor film, said perfluorinated lubricant having a viscosity sufficient, at an effective thickness, to protect said diamond-like carbon coating from abrasion; and bombarding said lubricant precursor film with an energetic beam of ions at an energy, a rate of ion arrival, and for an amount of time sufficient to rupture interatomic bonds in said diamond-like carbon coating and in said lubricant precursor film, forming an interface comprising atomic bonds between atoms in said diamond-like carbon coating and atoms in said lubricant precursor film.

DETAILED DESCRIPTION OF THE INVENTION

According to the present invention, the substrate to be coated is placed in a vacuum chamber that has been evacuated to base a pressure of preferably less than about $10^{-5}$ torr. A suitable DLC precursor material is deposited onto the substrate, preferably by vaporizing and condensing a precursor film onto the substrate using known means. Generally, the precursor is placed in a reservoir, heated to vaporization, typically between about 150° C.–170° C. (302° F.–338° F.), and directed onto the component, for example, using a right angled nozzle.

Suitable DLC precursor materials include parylenes, fullerenes, and carbon-based diffusion pump materials which have a low vapor pressure and can be vaporized stably at room temperature. Examples of suitable diffusion pump fluids include, but are not necessarily limited to: polyphenyl ether; elcosyl naphthalene; i-diamyl phthalate; i-diamyl sebacate; chlorinated hydrocarbons; n-dibutyl phthalate; n-dibutyl sebacate; 2-ethyl hexyl sebacate; 2-ethyl hexyl phthalate; di-2-ethyl-hexyl sebacate; tri-m-cresyl phosphate; tri-p-cresyl phosphate; dibenzyl sebacate. Preferred diffusion pump fluids include, but are not necessarily limited to, polyphenyl ether and elcosyl naphthalene.

Other suitable precursors are the vacuum-distilled hydrocarbon mineral oils manufactured by Shell Oil Company under the trademark APIEZON. Of this group, Apiezon A, Apiezon B, Apiezon C, and Apiezon D are the most appropriate. Other preferred DLC precursors are siloxanes, such as polydimethyl siloxane, pentaphenyltrimethyl siloxane, and other silicon containing diffusion pump fluids, preferably pentaphenyl-trimethyl siloxane.

The substrate and precursor film should be bombarded with an energetic beam of ions, either in a continuous or interrupted fashion, preferably substantially simultaneously with the deposition of the vaporized precursor molecules. A preferred ion species is argon. Other suitable ions include, but are not necessarily limited to nitrogen, hydrogen, silicon, methane, helium, neon, and mixtures thereof.

The ion beam should have an energy between about 500 eV to 100 keV, preferably about 10 keV. The energy of bombardment must be sufficient to ionize the constituent molecules in the precursor film, and to rupture the bonds between hydrogen and other atoms, thereby releasing the hydrogen into the surrounding vacuum to be pumped away.

The "ion arrival ratio" should be controlled in relation to the rate of arrival of the hydrocarbon precursor molecules.

The "ion arrival ratio" is defined as the ratio of each arriving ion to the number of precursor molecules present at the surface of the component.

The ion arrival ratio preferably should be at least 1 ion for every molecule of hydrocarbon precursor. This process should require about one ion for every 100 atoms in the final product coating; however, the required ion-to-atom ratio will vary according to the mass and energy of the ion species. Typically, 100 eV must be deposited for each carbon atom in the coating. Persons of ordinary skill in the art can relate the ion beam current per unit area to the arrival rate of precursor molecules.

The function of this ion bombardment step is to rupture at least about 80% of the carbon-hydrogen bonds in the precursor, resulting in the formation of a noncrystalline coating of amorphous carbon. The amorphous carbon formed in this manner has a relatively low residual hydrogen content, controllable by the level of ionic bombardment, within the range from 10 to 30 atomic percent hydrogen. The hardness of the amorphous carbon consequently is high, within the range of 10–20 GPa, and the compressive stress is low, i.e., below 100 MPa. The root mean square (rms) surface roughness of the coating is low, and has been measured to be below 3 nm.

The energy dissipated by the energetic ion bombardment during ion beam assisted deposition is in the form of inelastic electronic excitations equivalent to at least about 100 eV for each carbon atom within the deposited coating. This energy dissipation strongly enhances adhesion of the DLC coating by rupturing and subsequently reforming interatomic bonds across the interfaces. Persons of ordinary skill in the art will recognize how to achieve the correct linear energy of transfer in the ionizing process.

Thereafter, a lubricant, preferably a perfluorinated lubricant, such as a perfluoropolyether or perfluoropolyether alcohol, should be deposited onto the DLC. Preferred perfluoropolyethers are non-polar molecules with relatively high molecular weights of over about 1000 amu, most preferably over about 2000 amu, a preferred perfluoropolyether being FOMBLIN 18/8™, available from Montedison, SpA, Italy. A most preferred lubricant is the perfluoropolyalcohol FOMBLIN Z-DOL™, available from the same source, which has the formula $(HOCH_2-(OCF_2CF_2)_x-(OCF_2)_y-OCH_2OH)$ where x and y are such as to provide molecular weights in the range 1000–2000 amu. FOMBLIN Z-DOL™ is a polar substance which can be expected to anchor to the dangling bonds and activated surface moieties that result from ionic bombardment of the DLC film.

Relatively high molecular weight lubricants are preferred because they have relatively low vapor pressures. The relatively low vapor pressure of the lubricant permits a film of the vaporized lubricant molecules to condense onto the substrate even at relatively high temperatures, and the molecules will not easily vaporize off of the substrate after condensation. Lubricants with higher molecular weights also are sufficiently viscous to provide a protective boundary film for the substrate.

In a preferred embodiment, the perfluorinated lubricant, preferably FOMBLIN Z-DOLT™, is placed in a reservoir, heated to vaporization at between about 125–175° C. (257–347° F.), and directed onto the component. The component should be bombarded with an energetic beam of ions, either in a continuous or interrupted fashion, preferably substantially simultaneously with the deposition of the vaporized lubricant molecules. A preferred ion species is argon. Other suitable ions include, but are not necessarily limited to, nitrogen, hydrogen, silicon, methane, helium, or neon. During the first few minutes of the deposition process, the ion bombardment should be sustained at an energy between about 500 eV to 100 keV, preferably at about 10 keV. During the next minute or so, the ion flux (or current density) should be decreased, or ramped down to zero. A preferred timescale for the entire ion bombardment of the lubricant film is between about 2–3 minutes to deposit approximately 2 nm of fluid lubricant.

During the bombardment of the lubricant film, the "ion arrival ratio" should be controlled in relation to the rate of arrival of the lubricant molecules. The ion arrival ratio preferably should be at least 1 ion for every 10 molecules of lubricant. Typically, 100 eV must be deposited for each lubricant molecule.

The function of this ion bombardment step is to rupture interatomic bonds within the DLC coating and the polymeric lubricant so that new bonds to form, bridging the interface between the carbonaceous coating and the lubricant film. The resulting adhesion between the DLC coating and the lubricant film should be much stronger than the adhesion achieved by mere van der Waals' forces. Because the process is performed in a vacuum, the risk that contaminants, such as water vapor, will become adsorbed onto the DLC coating and interfere with adherence of the lubricant film to the DLC coating is decreased.

After ion bombardment of the lubricant film is complete, lubricant molecules should continue to be condensed onto the substrate without ion bombardment until a continuous lubricant film having a thickness of between about 1–2 nm is formed. Only after the formation of this film should the substrate be removed from the vacuum chamber.

In another embodiment of the present invention, the transition between the thermal vapor deposition of the DLC precursor and the thermal vapor deposition of the lubricant is graduated. A transition period of about 1–2 minutes should exist during which both DLC precursor and lubricant molecules are condensed together onto the substrate and ion bombarded. In practice, a transition period may be achieved simply by passing the substrate through a zone in which vaporized streams of DLC precursor and lubricant molecules overlap.

Although the invention has been described with reference to magnetic recording media, the present invention is suitable for use in any number of applications involving DLC coated substrates bearing a lubricant film. An example of another application is a surgical seal, for example, in a laparoscope. The present invention is directed both to the specific method for producing the lubricant film described herein, and to DLC coated substrates bearing a lubricant film which are made by any method sufficient to cause atomic bonds to form between atoms in the DLC coating and atoms in the lubricant film.

Many modifications and variations may be made in the embodiments described herein and depicted in the accompanying drawings without departing from the concept of the present invention. Accordingly, it is clearly understood that the embodiments described and illustrated herein are illustrative only and are not intended as a limitation upon the scope of the present invention.

We claim:

1. A method for adhering a lubricant coating to an amorphous carbon coating comprising directing a stream of a perfluorinated lubricant onto said amorphous carbon coating under first conditions effective to condense said perfluorinated lubricant onto said amorphous carbon coating in an amount sufficient to form a lubricant precursor film, said perfluorinated lubricant having a viscosity sufficient, at an effective thickness, to protect said amorphous carbon coating from abrasion; and bombarding said lubricant precursor film with an energetic beam of ions under second conditions effective to rupture interatomic bonds in said amorphous carbon coating and in said lubricant precursor film, forming an interface comprising atomic bonds between atoms in said amorphous carbon coating and atoms in said lubricant precursor film.

2. The method of claim 1 wherein said perfluorinated lubricant is selected from the group consisting of a perfluoropolyether and a perfluoropolyether alcohol; and said molecular weight is at least about 1000.

3. The method of claim 2 wherein said compound has the following general structure:

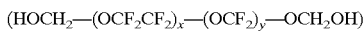

(HOCH$_2$—(OCF$_2$CF$_2$)$_x$—(OCF$_2$)$_y$—OCH$_2$OH)

wherein x and y have values which result in a molecular weight in the range of about 1000 to about 2000.

4. The method of claim 3 wherein said stream of a perfluorinated lubricant is a vaporized stream of perfluorinated lubricant.

5. The method of claim 2 wherein said conditions comprise said ion beam having an initial energy in the range of about 500 eV to about 100 keV;

said bombardment continuing for a first amount of time and at a first rate of ion arrival sufficient to deposit a total equivalent of about 100 eV for each molecule of said perfluorinated lubricant; and a subsequent rampdown in current density to zero over a second amount of time.

6. The method of claim 5 wherein said stream of a perfluorinated lubricant is a vaporized stream of perfluorinated lubricant.

7. The method of claim 5 wherein said initial energy is about 10 keV.

8. The method of claim 5 wherein said first amount of time is about 2 minutes; and said second amount of time is about 1 minute.

9. The method of claim 2 wherein said stream of a perfluorinated lubricant is a vaporized stream of perfluorinated lubricant.

10. The method of claim 9 further comprising, after said ion bombardment, continuing to condense a stream of said vaporized perfluorinated lubricant onto said diamond-like carbon coating to form a continuous lubricant coating having said effective thickness.

11. The method of claim 1 wherein said conditions comprise said ion beam having an initial energy in the range of about 500 eV to about 100 keV;

said bombardment continuing for a first amount of time and at a first rate of ion arrival sufficient to deposit a total equivalent of about 100 eV for each molecule of said perfluorinated lubricant; and a subsequent rampdown in current density to zero over a second amount of time.

12. The method of claim 11 wherein said stream of a perfluorinated lubricant is a vaporized stream of perfluorinated lubricant.

13. The method of claim 12 further comprising, after said ion bombardment, continuing to condense a stream of said vaporized perfluorinated lubricant onto said diamond-like carbon coating to form a continuous lubricant coating having said effective thickness.

14. The method of claim 11 wherein said initial energy is about 10 keV.

15. The method of claim 14 wherein said stream of a perfluorinated lubricant is a vaporized stream of perfluorinated lubricant.

16. The method of claim 11 wherein said first amount of time is about 2 minutes; and said second amount of time is about 1 minute.

17. The method of claim 16 wherein said stream of a perfluorinated lubricant is a vaporized stream of perfluorinated lubricant.

18. The method of claim 1 wherein said stream of a perfluorinated lubricant is a vaporized stream of perfluorinated lubricant.

19. The method of claim 18 further comprising, after said ion bombardment, continuing to condense a stream of said vaporized perfluorinated lubricant onto said amorphous carbon coating to form a continuous lubricant coating having said effective thickness.

20. The method of claim 19 wherein said stream of a perfluorinated lubricant is a vaporized stream of perfluorinated lubricant.

21. A method for adhering a lubricant coating to an amorphous carbon coating comprising directing a vaporized stream of a perfluorinated lubricant onto said amorphous carbon coating under first conditions effective to condense said perfluorinated lubricant onto said amorphous carbon coating in an amount sufficient to form a lubricant precursor film, said perfluorinated lubricant comprising molecules having the following general structure:

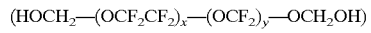

(HOCH$_2$—(OCF$_2$CF$_2$)$_x$—(OCF$_2$)$_y$—OCH$_2$OH)

wherein x and y result in a molecular weight in the range of about 1000 to about 2000;

bombarding said lubricant precursor film with an energetic beam of ions at an energy comprising (a) an initial energy in the range of about 500 eV to about 100 keV for a first amount of time and at a first rate of ion arrival sufficient to deposit a total equivalent of about 100 eV for each molecule of said perfluorinated lubricant, and (b) a subsequent rampdown in current density to zero over a second amount of time, wherein said energy, said amount of time, and said rate of ion arrival are sufficient to rupture interatomic bonds in both said amorphous carbon coating and in said lubricant precursor film and to form an interface comprising atomic bonds between atoms in said amorphous carbon coating and atoms in said lubricant precursor film.

22. The method of claim 21 wherein said initial energy is about 10 keV.

23. The method of claim 21 wherein said first amount of time is about 2 minutes; and said second amount of time is about 1 minute.

24. A method for adhering a lubricant coating to an amorphous carbon coating comprising directing a stream of a lubricant onto said amorphous carbon coating under first conditions effective to deposit said lubricant onto said amorphous carbon coating in an amount sufficient to form a lubricant precursor film, said lubricant having viscosity sufficient, at an effective thickness, to protect said amorphous carbon coating from abrasion; and subjecting said lubricant precursor film to conditions effective to rupture interatomic bonds in said amorphous carbon coating and in said lubricant precursor film, forming an interface comprising atomic bonds between atoms in said amorphous carbon coating and atoms in said lubricant precursor film.

25. The method of claim 24 wherein said lubricant comprises a perfluorinated lubricant.

26. The method of claim 24 wherein said lubricant comprises molecules having the following general structure:

$$(HOCH_2-(OCF_2CF_2)_x-(OCF_2)_y-OCH_2OH)$$

wherein x and y result in a molecular weight in the range of about 1000 to about 2000.

* * * * *